US009298340B2

(12) United States Patent
Lee

(10) Patent No.: US 9,298,340 B2
(45) Date of Patent: Mar. 29, 2016

(54) METHOD FOR INPUTTING TEXT AND DISPLAY APPARATUS USING THE SAME

(71) Applicant: SAMSUNG ELECTRONICS CO., LTD., Gyeonggi-do (KR)

(72) Inventor: Doh-hyeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/958,291

(22) Filed: Aug. 2, 2013

(65) Prior Publication Data

US 2013/0318468 A1    Nov. 28, 2013

Related U.S. Application Data

(63) Continuation of application No. 12/784,897, filed on May 21, 2010.

(30) Foreign Application Priority Data

Oct. 9, 2009   (KR) .......................... 10-2009-0096296

(51) Int. Cl.
*G06F 3/048*      (2013.01)
*G06F 3/0481*     (2013.01)
*G06F 3/023*      (2006.01)
(Continued)

(52) U.S. Cl.
CPC .............. *G06F 3/0481* (2013.01); *G06F 3/023* (2013.01); *G06F 3/0489* (2013.01); *H04N 21/4126* (2013.01); *H04N 21/42204* (2013.01)

(58) Field of Classification Search
CPC ................ G06F 3/04883; G06F 3/017; G06F 2203/0384; G06F 3/0488; H04N 1/00411; G06T 2200/24; H04L 41/22; H04L 43/045; H04L 67/025; G09G 2360/02; G09G 2370/16
See application file for complete search history.

(56) References Cited

U.S. PATENT DOCUMENTS

2002/0143805 A1* 10/2002 Hayes et al. .................. 707/500
2006/0130098 A1*  6/2006 Rao et al. ........................ 725/53
(Continued)

FOREIGN PATENT DOCUMENTS

WO    2008/130183 A1    10/2008
WO    2008/137158 A1    11/2008

OTHER PUBLICATIONS

Communication dated Jan. 14, 2015, issued by the European Patent Office in counterpart European Application No. 10176020.5.
(Continued)

*Primary Examiner* — Jeffrey A Gaffin
*Assistant Examiner* — Ayesha Huertas Torres
(74) *Attorney, Agent, or Firm* — Sughrue Mion, PLLC

(57) ABSTRACT

A method of inputting text to a display device using a mobile device, the method including transmitting a text input box activation signal that instructs the display device to activate input to a text input box displayed on a screen of the display device, receiving a request to execute a text input mode of inputting the text to the display device using a keyboard displayed on a screen of the mobile device, displaying the keyboard of the text input mode on the screen of the mobile device, receiving a text input through the keyboard displayed on the screen of the mobile device, and transmitting a text input display signal that instructs the display device to display text corresponding to the text input received through the keyboard displayed on the screen of the mobile device in the text input box displayed on the screen of the display device.

13 Claims, 6 Drawing Sheets

(51) Int. Cl.
*G06F 3/0489* (2013.01)
*H04N 21/41* (2011.01)
*H04N 21/422* (2011.01)

(56) References Cited

U.S. PATENT DOCUMENTS

2008/0303793 A1* 12/2008 Carroll .......................... 345/168
2009/0007001 A1   1/2009 Morin et al.
2009/0146860 A1   6/2009 Kwon
2010/0094646 A1*  4/2010 Egami et al. .................... 705/2
2010/0100839 A1*  4/2010 Tseng et al. ................... 715/780

OTHER PUBLICATIONS

Communication dated Jan. 23, 2015, issued by the European Patent Office in counterpart European Application No. 10176020.5.
Communication dated Apr. 7, 2015, issued by the European Patent Office in counterpart European Application No. 10176020.5.

* cited by examiner

METHOD FOR INPUTTING TEXT AND DISPLAY APPARATUS USING THE SAME

CROSS-REFERENCE TO RELATED APPLICATION

This application is a continuation application of U.S. application Ser. No. 12/784,897, filed on May 21, 2010, in the U.S. Patent and Trademark Office, which claims priority from Korean Patent Application No. 10-2009-0096296, filed on Oct. 9, 2009, in the Korean Intellectual Property Office, the disclosures of which are incorporated herein by reference in their entireties.

BACKGROUND

1. Field

Apparatuses and methods consistent with exemplary embodiments relate to a method for inputting a text and a display apparatus using the same, and more particularly, to a method for inputting a text used to operate a display apparatus and a display apparatus using the same.

2. Description of the Related Art

Television (TV) has been developed to provide various functions such as surfing the Internet as well as receiving broadcasting. An operation of inputting text is an essential part of Internet-surfing. However, a remote controller of the TV is not designed to input text, and thus a user experiences inconvenience in inputting text. Accordingly, a remote controller having a keyboard or another device to conveniently input text is required.

There is a need for methods for the user to conveniently input text, and a convenient procedure to input text is required.

SUMMARY

Exemplary embodiments address at least the above problems and/or disadvantages and other disadvantages not described above. Also, an exemplary embodiment is not required to overcome the disadvantages described above, and an exemplary embodiment of the present inventive concept may not overcome any of the problems described above.

Exemplary embodiments provide a method for inputting a text in which a device inputs a text as a substitute for another device, and a display apparatus using the same.

According to an aspect of an exemplary embodiment, there is provided a method for inputting a text, the method including: in response to determining that a situation in which text is to be input occurs, transferring a message for requesting execution of a text input mode to an external device; receiving the text from the external device; and displaying the received text.

The method may further include determining whether the situation in which the text is to be input ceases; and if it is determined that the situation ceases, transferring a message for requesting termination of the text input mode to the external device.

The situation in which the text is to be input ceases may be when a text input box which displays the received text disappears or when the text input box is inactivated.

The situation in which the text is be input occurs may be when a text input box on a web page, a menu screen, a content browser screen, or a setup screen displayed on a display is activated.

The method may further include setting wireless communication with the external device prior to the determining; and performing a command received from the external device.

The displaying may ignore previously received text, and display most recently received text.

The determining, transferring, receiving and displaying may be performed on a broadcast receiving apparatus which receives and displays broadcasting data, and the external device performs operations independent of the broadcast receiving apparatus.

The method may further include, in response to a command received from a remote controller of the broadcast receiving apparatus during the receiving and displaying, performing the received user's command together with the receiving and displaying.

According to an aspect of another exemplary embodiment, there is provided a display apparatus, including: a display; a communication unit which is connected to an external device for communication; and a controlling unit which controls a message for requesting execution of a text input mode to be transferred to an external device through the communication unit if it is determined that a situation in which text is be input occurs, and which controls the text to be displayed on the display if the text input through the external device is received by the communication unit.

The controlling unit may transfer a message for requesting termination of the text input mode to the external device through the communication unit if it is determined that the situation in which the text is to be input ceases.

The situation in which the text is to be input ceases may be when a text input box which displays the received text disappears or when the text input box is inactivated.

The situation in which the text is to be input occurs may be when a text input box on a web page, a menu screen, a content browser screen, and/or a setup screen displayed on a display is activated.

The controlling unit may perform a command received from the external device through the communication unit.

The controlling unit may control a previously received text to be ignored, and control a recently received text to be displayed on the display.

The display apparatus may include a broadcast receiving apparatus which receives and displays broadcasting, and the external device may include a device which performs operations independent of the broadcast receiving apparatus.

If a command is received from a remote controller of the broadcast receiving apparatus during the process of controlling the text input through the external device to be received through the communication unit and displayed on the display unit, the controlling unit may control the received user's command to be performed together with the receiving and the displaying.

According to an aspect of yet another exemplary embodiment, there is provided a method for inputting text, including: determining whether a first message is received from a display apparatus indicating that a situation in which a text is to be input occurs; converting a current mode into a text input mode if it is determined that the first message is received; and transferring a text being input in the text input mode to the display apparatus.

The text input mode may include a mode for providing a keyboard for inputting a text as a graphic.

The method may further include determining whether a second message is received from a display apparatus indicating that the situation in which the text is to be input ceases; and returning to a mode prior to the text input mode if it is determined that the second message is received.

The method may further include: setting wireless communication with the display apparatus prior to the determining; and performing a command received from the display apparatus.

The transferring may be performed whenever each text is input.

Whenever each text is input, the transferring may transfer the text; or whenever each text is input, the transferring may transfer all of the texts which has been input.

The transferring may be performed when all characters of the text are completely input.

According to an aspect of still another exemplary embodiment, there is provided a mobile device, including: a communication unit which is communicably linked with a display apparatus; a touchscreen which displays visual data of the mobile device and which receives an input from a user; and a controlling unit which controls the touchscreen to convert from a current operating mode into a text input mode in response to the wireless communication unit receives, from the display apparatus, a first message indicating that a situation in which text is to be input to the display apparatus occurs, and which controls the wireless communication unit to transfer the text input through the touchscreen in the text input mode to the display apparatus.

According to an aspect of another exemplary embodiment, there is provided a system for inputting and displaying text, the system including: a display apparatus including: a display, a first wireless communication unit which transmits and receives messages, and a first controlling unit which controls the communication unit to transmit a message for requesting execution of a text input mode in response to determining that a situation in which text is to be input occurs, and which controls the display to display the text if the text is received through the communication unit; and a mobile device, including: a second wireless communication unit which wirelessly communicates with the display apparatus, a touchscreen to display visual data of the mobile device and to receive an input from a user, and a controlling unit which controls the touchscreen to convert from a current operating mode into the text input mode in response to determining that the wireless communication unit receives, from the display apparatus, the message indicating that the situation in which the text is to be input to the display apparatus occurs, and which controls the wireless communication unit to transfer the text input through the touchscreen in the text input mode to the display apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
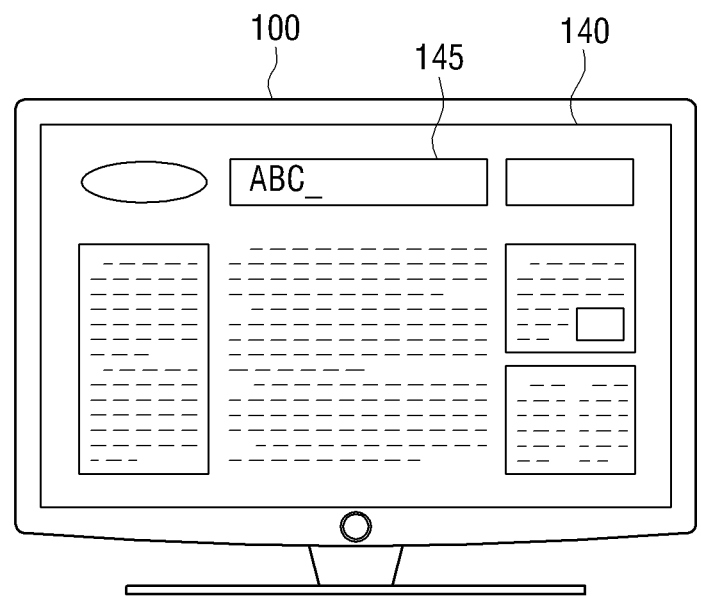
FIG. 1 is a view illustrating a broadcast receiving system applicable to an exemplary embodiment.
Figure 1:
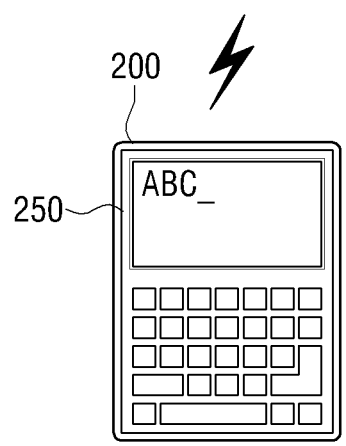

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating a broadcast receiving system applicable to an exemplary embodiment. Referring to FIG. 1, the broadcast receiving system is implemented using an IP-TV 100 and a mobile device 200. The IP-TV 100 is coupled with the mobile device 200 for wireless communication. While the current exemplary embodiment is described with reference to the IP-TV 100, it is understood that all embodiments of the present inventive concept are not limited to the IP-TV 100, and other types of TVs may be provided in other exemplary embodiments.

The IP-TV 100 is a kind of broadcast receiving apparatus which provides a user with broadcasting received over air, a cable, Internet, and so on, and enables a user to surf the Internet.

The mobile device 200, which is a portable device such as a mobile phone, MPEG Audio Layer 3 (MP3) player, a video player, a portable multimedia player (PMP), a personal digital assistant (PDA), a Ultra-Mobile PC (UMPC), and so on, may perform operations independent of the IP-TV 100. For example, the mobile device 200 may be a remote controller for the IP-TV 100 which includes a display to play back contents.

The mobile device 200 receives a user's command relating to the IP-TV 100, and transfers the user's command to the IP-TV 100. Furthermore, the mobile device 200 may operate in the same manner as the remote controller of the IP-TV 100.

The IP-TV 100 is communicably linked to the mobile device 200 for wireless communication, and transceives information therebetween. While Wi-Fi may be used in the exemplary embodiment of the present inventive concept as the wireless communication protocol, it is understood that all embodiments are not limited thereto. Alternatively, other wireless communication protocols, such as infrared or Bluetooth, may be applied to the exemplary embodiment.

Text being input through a touchscreen 250 of the mobile device 200 is shown on a text input box 145 of a display 140 of the IP-TV 100, as shown in FIG. 1. Referring to FIG. 1, the text "ABC" which is input through the touchscreen 250 of the mobile device 200 appears on the text input box 145 displayed on the display 140 of the IP-TV 100 as the text is input through the touchscreen 250.

To display the text being input through the mobile device 200 on the IP-TV 100, a series of operations is performed. This will be explained in detail with reference to FIGS. 3 and 4 below.

Figure 2:
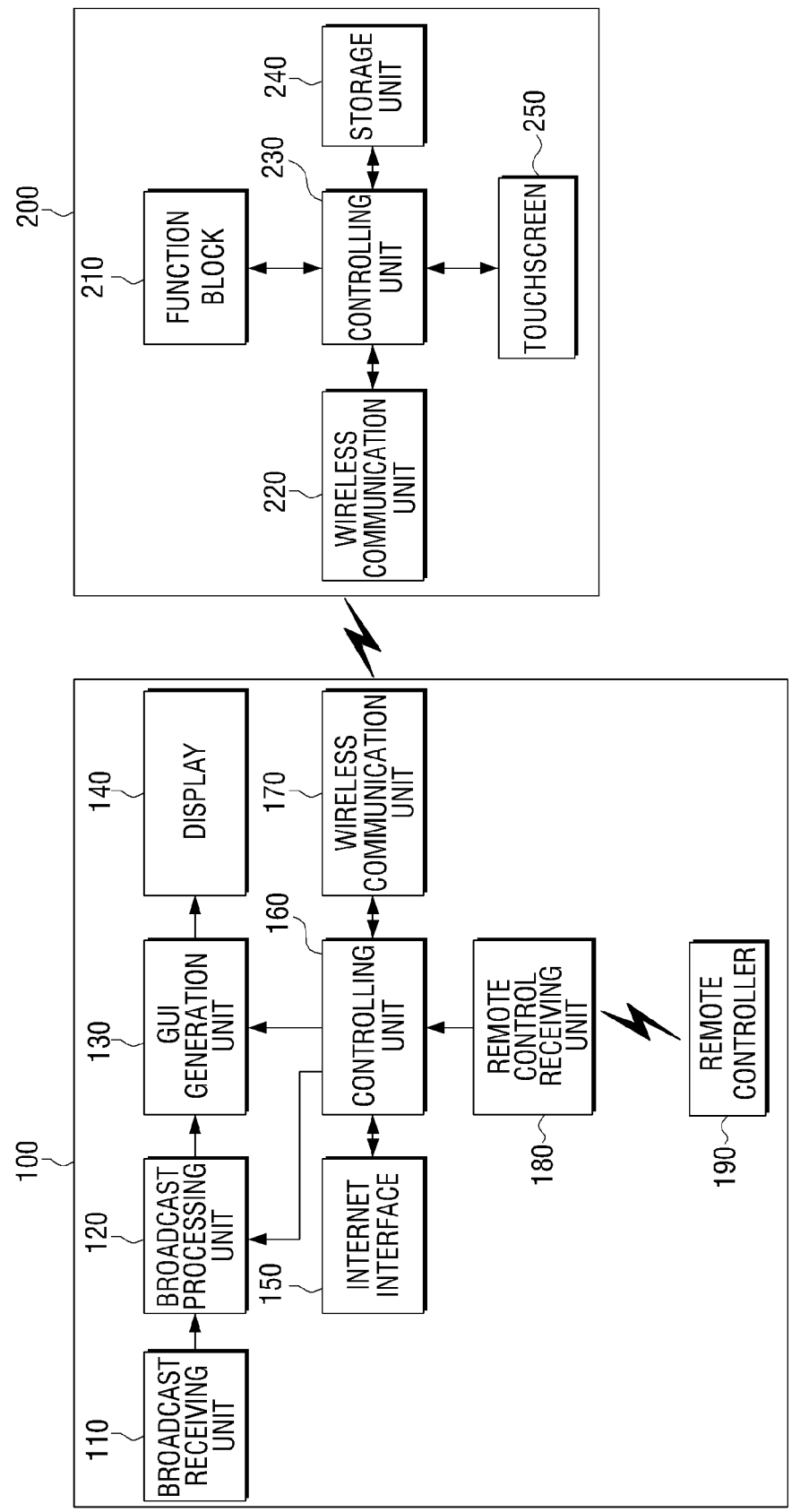
FIG. 2 is a block diagram illustrating an Internet Protocol television (IP-TV) and a mobile device of FIG. 1.

Hereinbelow, the structure of the IP-TV 100 and the mobile device 200 will be explained in detail with reference to FIG. 2. FIG. 2 is a block diagram illustrating the IP-TV 100 and the mobile device 200 of FIG. 1. Referring to FIG. 2, the IP-TV 100 includes a broadcast receiving unit 110, a broadcast processing unit 120, a graphical user interface (GUI) generation unit 130, a display 140, an Internet interface 150, a controlling unit 160, a wireless communication unit 170, a remote control receiving unit 180, and a remote controller 190.

The broadcast receiving unit 110 receives broadcasting from a broadcasting station or a satellite via a wired and/or wireless communication, and demodulates the received broadcasting. The broadcast processing unit 120 performs signal processing on the broadcasting output from the broadcast receiving unit 110 in a manner of video decoding, video scaling, and so on.

The GUI generation unit 130 generates a GUI, and adds the generated GUI to the broadcasting output from the broadcast processing unit 120. The GUI, which is generated by the GUI generation unit 130 and is added to the broadcasting output from the broadcast processing unit 120, includes a menu, additional information, a graphic controller, a web page, and contents received through the Internet interface 160. The display 140 displays the broadcasting having the GUI output from the GUI generation unit 130. The Internet interface 160 accesses the Internet, and receives the contents and the web page.

The wireless communication unit 170 is coupled with the mobile device 200 for wireless communication, and transceives contents, a user command, and a message to or from the mobile device 200. The remote control receiving unit 180 receives a command which is input through the remote controller 190 by a user.

The controlling unit 160 controls the broadcast receiving unit 110, the broadcast processing unit 120, the GUI generation unit 130, the display 140, the Internet interface 150, and the wireless communication unit 170 so that the IP-TV 100 operates to respond to: i) a user's command which is received from the mobile device 200 through the wireless communication unit 170; and ii) a user's command which is received from the remote controller 190 through the remote control receiving unit 180.

The mobile device 200 illustrated in FIG. 2 includes a function block 210, a wireless communication unit 220, a controlling unit 230, a storage unit 240, and a touchscreen 250.

The function block 210 performs a usual operation of the mobile device 200. For example, if the mobile device 200 is a mobile phone, the function block 210 performs mobile telephony, text messaging, and so on. Furthermore, if the mobile device 200 is an MP3 player, the function block 210 plays back contents such as music or a movie.

The wireless communication unit 220 is communicably linked to the wireless communication unit 170 of the IP-TV 100 for wireless communication, and transceives contents, a user's command, and a message to or from the IP-TV 100.

The storage unit 240 stores programs and data used to drive the mobile device 200, and provides a storage space to store contents.

The touchscreen 250 may operate to display the result of operations performed by the function block 210, and may also operate to receive an input of a user's command by touching and/or dragging.

The controlling unit 230 controls the function block 210 to perform a user's command input through the touchscreen 250, and performs a request received from the IP-TV 100 through the wireless communication unit 220.

Figure 3:
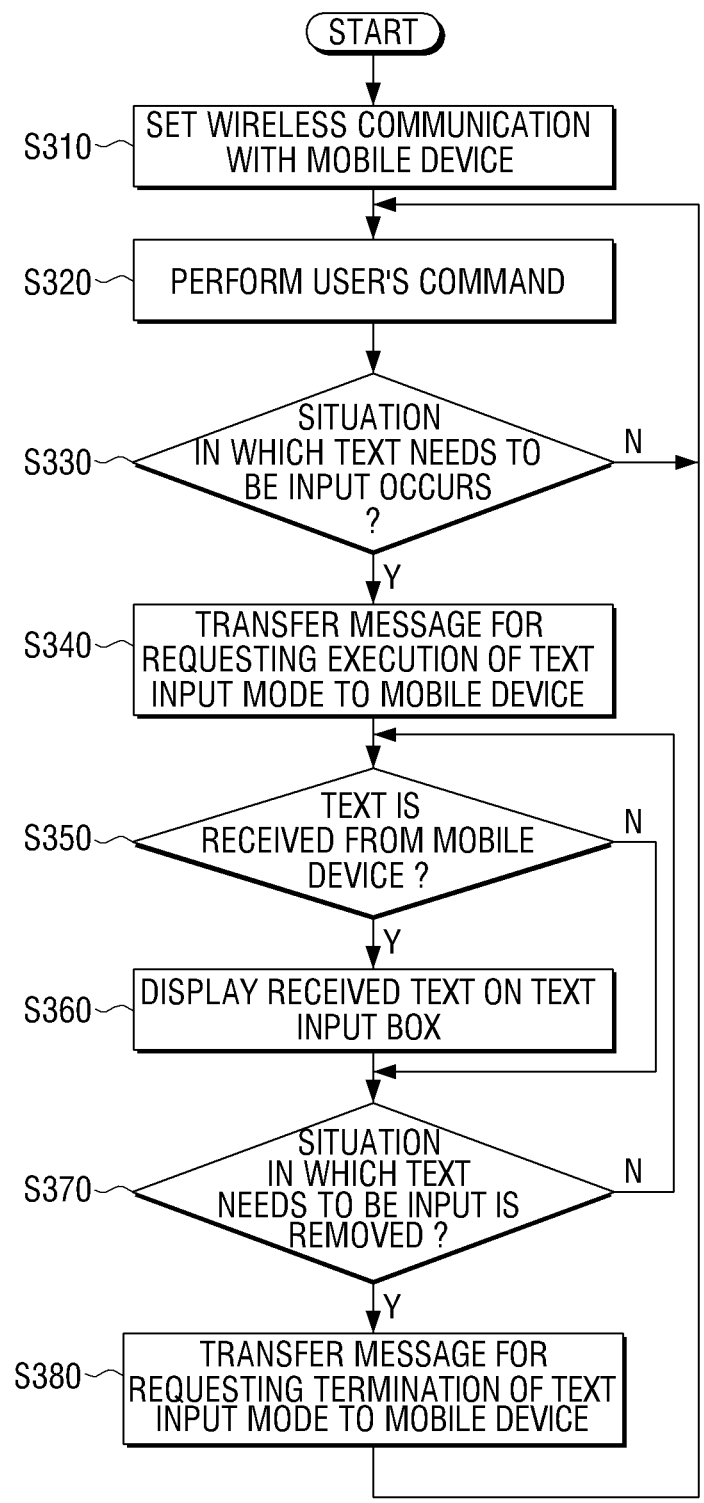
FIG. 3 is a flowchart provided to explain a method for inputting text according to an exemplary embodiment.
Figure 4:
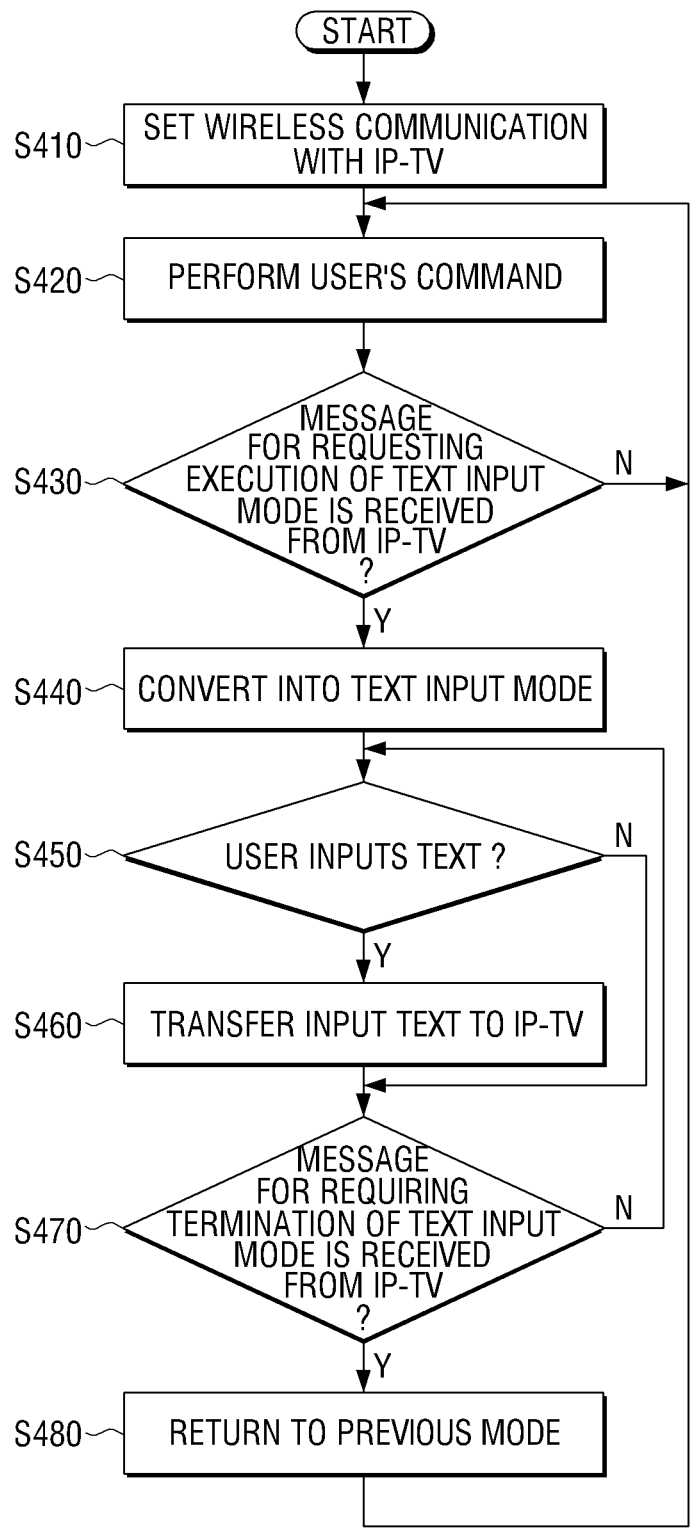
FIG. 4 is a flowchart provided to explain a method for inputting text according to another exemplary embodiment.

Hereinbelow, the process whereby the mobile device 200 inputs text used for the IP-TV 100 as a substitute for the IP-TV 100 will be explained in detail with reference to FIGS. 3 and 4. FIG. 3 illustrates an operation of the IP-TV 100 when the mobile device 200 inputs text as a substitute for the IP-TV 100, and FIG. 4 illustrates an operation of the mobile device 200 when the mobile device 200 inputs text as a substitute for the IP-TV 100.

FIG. 3 is a flowchart provided to explain a method for inputting text according to an exemplary embodiment. Referring to FIG. 3, the wireless communication unit 170 of the IP-TV 100 is wirelessly coupled with the wireless communication unit 220 of the mobile device 200 in operation S310.

The controlling unit 160 of the IP-TV 100 controls elements of the IP-TV 100 to perform a user's command input through the remote controller 190 or the mobile device 200 (S320). The controlling unit 160 determines whether a situation in which a text is to be input occurs during operation S320 (S330). The situation in which a text is to be input may arise when the text input box 145 displayed on the display 140 is activated and, thus, a text is about to be input by a user, as shown in FIG. 1. However, it is understood that all embodiments are not limited thereto. For example, the situation in which a text is to be input may arise when a menu screen, a content browser screen, or a setup screen other than the web page is activated.

If it is determined that the situation in which a text is to be input occurs (S330-Y), the controlling unit 160 transfers a message for requesting execution of a text input mode to the mobile device 200 through the wireless communication unit 220 (S340). The message for requesting execution of the text input mode may request to pause a currently executing mode, and execute the text input mode to input a text by a user.

The mobile device 200 which receives the message for requesting execution of the text input mode converts a current mode into the text input mode, receives an input of a text from the user, and transfers the input text to the IP-TV 100. If the text is received from the mobile device 200 in operation S350-Y, the controlling unit 160 controls the GUI generation unit 160 to display the received text on the text input box 145 in operation S360.

The controlling unit 160 determines whether the situation in which a text is to be input ceases during operations S350 and S360 (S370). The cessation of the situation in which a text is to be input may occur when the text input box 145, which has been activated and thus a text is about to be input by a user, disappears from the display 140 or is inactivated.

If it is determined that the situation in which a text is to be input is removed (S370-Y), the controlling unit 160 transfers a message for requesting termination of the text input mode to the mobile device 200 through the wireless communication unit 170 (S380). The message for requesting termination of the text input mode requests to terminate a currently executing text input mode, and return to a mode prior to the text input mode. Accordingly, the mobile device 200 which receives the message for requesting termination of a text input mode terminates the text input mode, and returns to a mode prior to the text input mode.

FIG. 4 is a flowchart provided to explain a method for inputting a text according to another exemplary embodiment. As described above, the operations of the mobile device 200 are illustrated in FIG. 4. Referring to FIG. 4, the wireless communication unit 220 of the mobile device 200 is wirelessly coupled with the wireless communication unit 170 of the IP-TV 100 (S410).

The controlling unit 230 of the mobile device 200 controls elements of the mobile device 200 to perform a user's command input through the touchscreen 250 (S420). For example, if a command for manipulating the IP-TV 100 is input through the touchscreen 250, the controlling unit 230 transfers the input command to the IP-TV 100 through the wireless communication unit 220.

The controlling unit 230 determines whether a message for requesting execution of a text input mode is received from the IP-TV 100 during operation S420 (S430).

If it is determined that the message for requesting execution of the text input mode is received (S430-Y), the controlling unit 230 converts a current mode of the mobile device 200 into the text input mode (S440). If the current mode of the mobile device 200 is converted into the text input mode in operation S440, a keyboard and an input box to input a text are displayed on the touchscreen 250 of the mobile device 200 as a graphic, as shown in FIG. 1.

If a user inputs a text using the touchscreen 250 (S450-Y), the controlling unit 230 transfers the input text to the IP-TV 100 (S460).

The controlling unit 230 determines whether a message requesting termination of the text input mode is received from the IP-TV 100 through the wireless communication unit 220 during operations S450 and S460 (S470). If it is determined that the message requesting termination of the text input mode is received (S470-Y), the controlling unit 230 terminates the text input mode, and returns to a mode prior to the text input mode (S480).

A process of the mobile device 200 inputting a text used for the IP-TV 100 as a substitute for the IP-TV 100 has been described in the above exemplary embodiments with reference to FIGS. 3 and 4.

Figure 5:
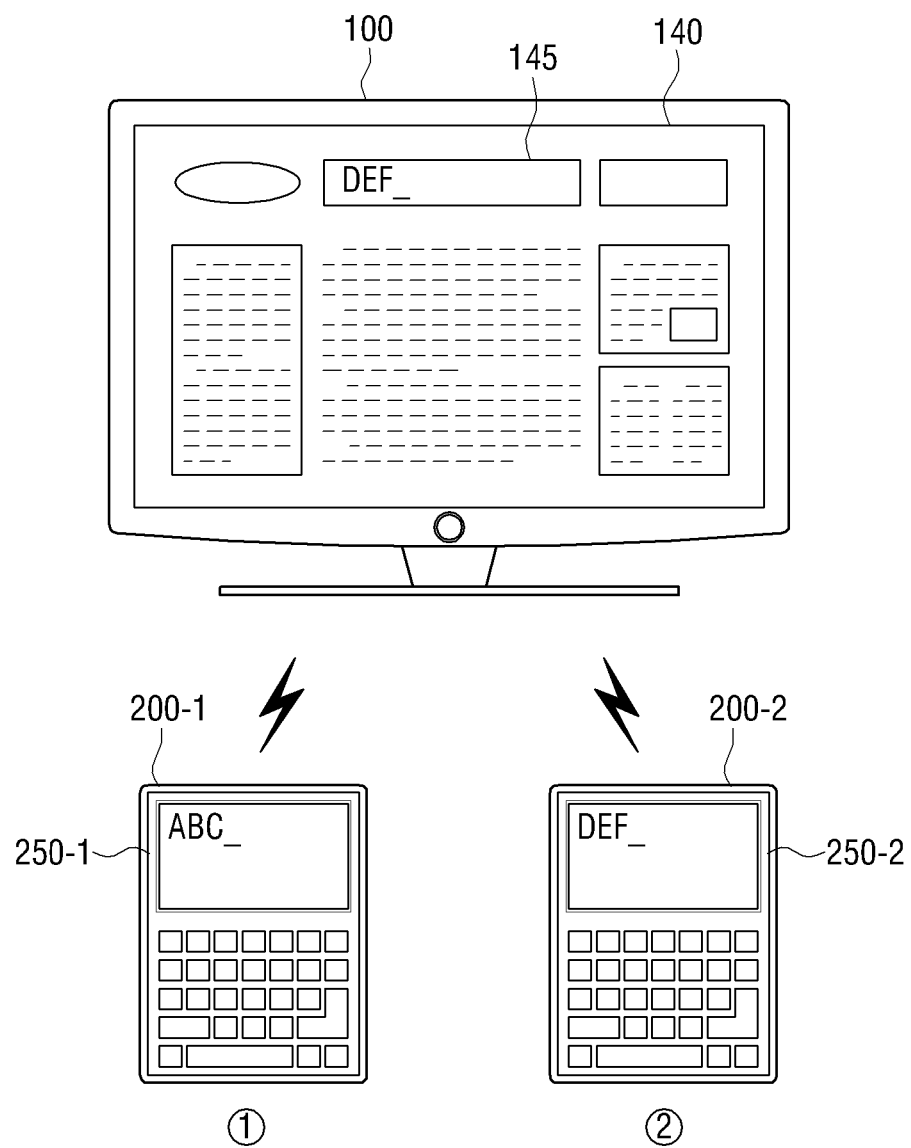
FIG. 5 is a view illustrating a broadcast receiving system in which two mobile devices are connected to a single IP-TV.

While a single mobile device 200 is connected to a single IP-TV 100 in the exemplary embodiments described above, it is understood that this is merely exemplary for convenience of description. Alternatively, in other exemplary embodiments, a plurality of mobile devices 200 may be connected to the single IP-TV 100. FIG. 5 is a view illustrating a broadcast receiving system in which two mobile devices 200-1, 200-2 are connected to the single IP-TV 100.

In the broadcast receiving system illustrated in FIG. 5, text may be input through the two mobile devices 200-1, 200-2. To prevent confusion in inputting text, the IP-TV 100 displays only the text which is most recently received from among the texts received from the two mobile devices 200-1, 200-2 on the text input box 145.

For example, if the text "ABC" is input through the first mobile device 200-1, and then the text "DEF" is input through the second mobile device 200-2, only the text "DEF" is displayed on the text input box 145 of the IP-TV 100. That is, the IP-TV 100 ignores the text which is received first.

The mobile devices 200-1, 200-2 transfer all of the texts which have been input to the IP-TV 100. That is, if a user inputs the text "D," the second mobile device 200-2 transfers the text "D" to the IP-TV 100, if the user further inputs the text "E," the second mobile device 200-2 transfers the text "DE" to the IP-TV 100, and if a user further inputs the text "F," the second mobile device 200-2 transfers the text "DEF" to the IP-TV 100. This is because the IP-TV 100 ignores all of the previously received texts except for the most recently received text, although the texts are received from the same mobile device.

Figure 6:
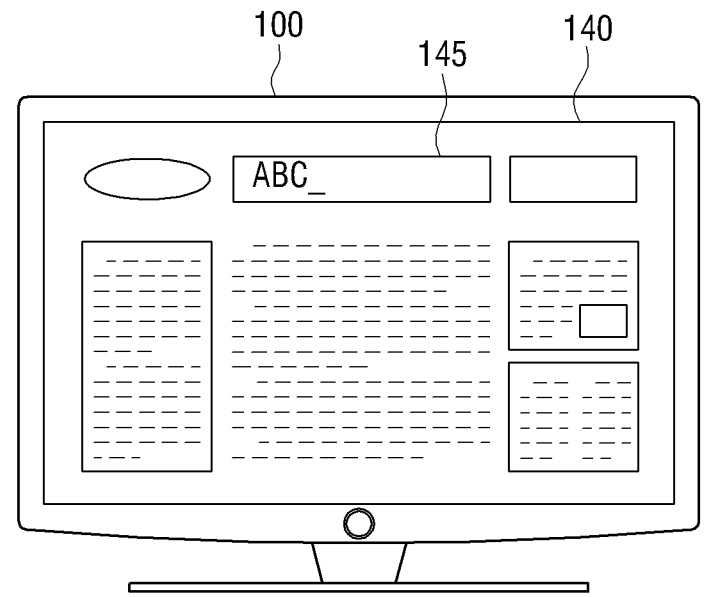
FIG. 6 is a view provided to further explain exemplary embodiments.
Figure 6:
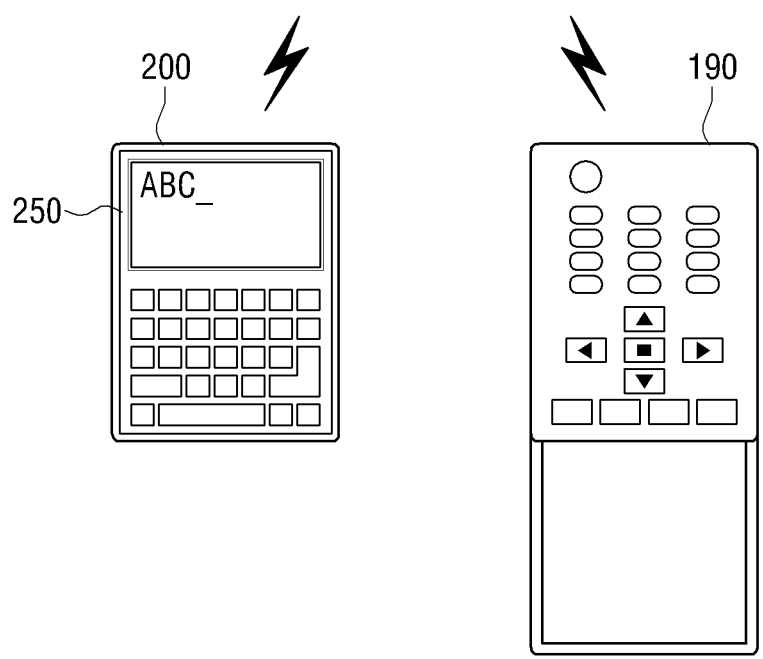

Alternatively, the IP-TV 100 may receive a user's command from the remote controller 190 and processes the command, even while the mobile device 200 inputs text as a substitute for the IP-TV 100. That is, in the situation illustrated in FIG. 6, the IP-TV 100 may operate in response to a manipulation of the user using the remote controller 190 even while text is input through the mobile device 200.

The operation of transferring text from the mobile device 200 to the IP-TV 100 may be performed whenever each text is input, and may also be performed only when all of the texts are completely input. In the former case, the mobile device 200 may transfer each text whenever the text is input, and may also transfer all of the texts which have been input whenever the text is input. In the case in which the text is transferred whenever each text is input, if a user deletes some of the already input texts, the mobile device 200 transfers the manipulation of deleting the texts to the IP-TV 100, and thus the IP-TV 100 causes the deleted texts to disappear from the display 140.

The operation of converting a current mode into text input mode may be implemented to execute a program which causes a keyboard for inputting a text to be displayed on the touchscreen 250 as a graphic.

As described above, according to the exemplary embodiments, if a situation in which text is to be input occurs, an external device automatically operates in a text input mode. Accordingly, inconvenience which a user may experience by manually converting a current mode of the external device into a text input mode is prevented, and thus the user more conveniently inputs texts.

While not restricted thereto, exemplary embodiments can also be realized as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Exemplary embodiments may also be realized as a data signal embodied in a carrier wave and comprising a program readable by a computer and transmittable over the Internet. Moreover, while not required in all aspects, one or more units of the IP-TV 100 or the mobile phone 200 can include a processor or microprocessor executing a computer program stored in a computer-readable medium. Also, the exemplary embodiments can be written as computer programs transmitted over a computer-readable transmission medium, such as a carrier wave, and received and implemented in general-use digital computers that execute the programs.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of inputting text to a display device using a mobile device, the method comprising:
　　transmitting, to the display device, a signal for the display device to activate a text input user interface on a screen of the display device;
　　receiving, from the display device, a request to execute a text input mode of inputting the text to the display device using a keyboard to be displayed on a touchscreen of the mobile device, the request being transmitted by the display device in response to activation of the text input user interface;
　　displaying the keyboard of the text input mode on the touchscreen of the mobile device in response to receiving the request from the display device;

receiving at least one of a touch input and a drag input for selecting one or more text characters of the keyboard displayed on the touchscreen of the mobile device; and transmitting a text input display signal that instructs the display device to display text corresponding to the one or more text characters selected through the keyboard displayed on the touchscreen of the mobile device in the text input user interface displayed on the screen of the display device.

2. The method as claimed in claim 1, further comprising:
transmitting, to the display device, data related to the one or more text characters received through the keyboard displayed on the touchscreen of the mobile device.

3. The method as claimed in claim 1, further comprising:
displaying a second text input user interface on the touchscreen of the mobile device; and
displaying the text corresponding to the one or more text input characters received through the keyboard displayed on the screen touchscreen of the mobile device in the second text input user interface.

4. The method as claimed in claim 3, wherein the signal is a text input user interface activation signal that instructs the display device to display the text input user interface and to activate input to the text input user interface displayed on a web page, a menu screen, a content page screen, or a setup screen displayed on the screen of the display device.

5. The method as claimed in claim 1, wherein the receiving, from the display device, receives the request to execute the text input mode of inputting the text to the display device using the keyboard to be displayed on the touchscreen of the mobile device, in response to transmitting the text input user interface activation signal to the display device.

6. A non-transitory computer-readable recording medium having recorded thereon a program which when executed causes a mobile device to execute a method of inputting text to a display device using the mobile device, the method comprising:
transmitting, to the display device, a signal for the display device to display a text input user interface on a screen of the display device;
receiving, from the display device, a request to execute a text input mode of inputting the text to the display device using a keyboard to be displayed on a touchscreen of the mobile device, the request being transmitted by the display device in reponse to activation of the text input user interface;
displaying the keyboard of the text input mode on the touchscreen of the mobile device in response to receiving the request from the display device;
receiving at least one of a touch input and a drag input for selecting one or more text characters of the keyboard displayed on the touchscreen of the mobile device; and
transmitting a text input display signal that instructs the display device to display text corresponding to the one or more text characters selected through the keyboard displayed on the touchscreen of the mobile device in the text input user interface displayed on the screen of the display device.

7. The non-transitory computer-readable recording medium of claim 6, wherein the method further comprises:
transmitting, to the display device, data related to the one or more text characters received through the keyboard displayed on the touchscreen of the mobile device.

8. The non-transitory computer-readable recording medium of claim 6, wherein the method further comprises:
displaying a second text input user interface on the touchscreen of the mobile device; and
displaying the text corresponding to the one or more text characters received through the touchscreen of the mobile device in the second text input user interface.

9. The non-transitory computer-readable recording medium of claim 8, wherein the signal is a text input user interface activation signal that instructs the display device to display the text input user interface and to activate input to the text input user interface displayed on a web page, a menu screen, a content page screen, or a setup screen displayed on the screen of the display device.

10. A mobile device comprising:
a touchscreen;
a communication unit; and
a controller configured to control the communication unit to transmit, to a display device, a signal for the display device to activate a text input user interface on a screen of the display device, to receive, from the display device, a request to execute a text input mode of inputting text to the display device using a keyboard to be displayed on the touchscreen of the mobile device, the request being transmitted by the display device in response to activation of the text input user interface, to display the keyboard of the text input mode on the touchscreen of the mobile device in response to receiving the request from the display device, to receive touch input for selecting one or more text characters of the keyboard displayed on the touchscreen of the mobile device, and to control the communication unit to transmit to the display device a text input signal such that the display device displays text corresponding to the one or more text characters selected through the keyboard displayed on the touchscreen of the mobile device in the text input user interface displayed on the screen of the display device.

11. The mobile device of claim 10, wherein the controller is further configured to control the communication unit to transmit, to the display device, data related to the one or more text characters received through the keyboard displayed on the touchscreen of the mobile device.

12. The mobile device of claim 10, wherein the controller is further configured to control display of a second text input user interface on the touchscreen of the mobile device and control display of the text corresponding to the one or more text characters received through the touchscreen of the mobile device in the second text input user interface.

13. The mobile device of claim 12, wherein the signal is a text input user interface activation signal that instructs the display device to display the text input user interface and to activate input to the text input user interface displayed on a web page, a menu screen, a content page screen, or a setup screen displayed on the screen of the display device.

* * * * *